US006185500B1

(12) United States Patent
Ketterer et al.

(10) Patent No.: US 6,185,500 B1
(45) Date of Patent: Feb. 6, 2001

(54) METHOD AND DEVICE FOR DETERMINING THE ION FLOW IN INTERNAL COMBUSTION ENGINES

(75) Inventors: Markus Ketterer; Achim Günther, both of Stuttgart; Udo Niessner, Ingersheim; Jürgen Förster, Chemnitz, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/319,041

(22) PCT Filed: Jul. 3, 1998

(86) PCT No.: PCT/DE98/01839

§ 371 Date: Jun. 1, 1999

§ 102(e) Date: Jun. 1, 1999

(87) PCT Pub. No.: WO99/18350

PCT Pub. Date: Apr. 15, 1999

(30) Foreign Application Priority Data

Oct. 7, 1997 (DE) ........................................ 197 44 163

(51) Int. Cl.[7] ........................ G06F 19/00; G01M 15/00

(52) U.S. Cl. ........................ 701/111; 701/115; 73/116

(58) Field of Search ........................ 123/406.13, 406.14, 123/406.21, 406.27, 406.29, 435; 73/116, 117.3; 324/391; 701/103, 111, 115

(56) References Cited

U.S. PATENT DOCUMENTS 5,206,809 * 4/1993 Iwakiri et al. ........................ 701/111
5,230,240 * 7/1993 Ohsawa et al. ........................ 73/116
5,337,716 * 8/1994 Fukui et al. ........................ 701/111
5,687,082 * 11/1997 Rizzoni ........................ 701/111
5,775,298 * 7/1998 Haller ........................ 701/111
5,904,127 * 5/1999 Kemmler et al. ........................ 123/435

FOREIGN PATENT DOCUMENTS

3128027 * 2/1983 (DE) .

* cited by examiner

*Primary Examiner*—Willis R. Wolfe
(74) *Attorney, Agent, or Firm*—Walter Ottesen

(57) ABSTRACT

A method for processing the ion flow signals of internal combustion engines by offset correction, masking and multiplexing for engine control functions wherein, after the measurement of the ion flow signal in each cylinder for the purpose of offset correction in advance of each ignition operation, the level of the measurement signal of the cylinder is detected; during masking operation, the measurement signal is substituted in a second signal by the level value and is subtracted from the second signal until the next ignition operation and thereafter, the channels which are to be multiplexed, are combined to a third signal by the addition of the second signals of the particular cylinders, the second signal being derived from the measurement signal.

18 Claims, 6 Drawing Sheets

METHOD AND DEVICE FOR DETERMINING THE ION FLOW IN INTERNAL COMBUSTION ENGINES

FIELD OF THE INVENTION

An ionization of the participating gases takes place because of chemical and physical processes during combustion. A current can be measured when a voltage is applied to two electrodes which project into the gas and are insulated from each other. This is characterized in the following as an ion flow.

BACKGROUND OF THE INVENTION

This phenomenon can also be observed in internal combustion engines such as in spark-ignition engines. For some time, it has been attempted to utilize the ion flow for various engine control and diagnostic functions such as for knock detection, misfire detection, phase detection, estimation of combustion pressure or the position of the pressure maximum, determination of the mixture composition and for detection of the lean running limit.

The spark plug is usually used as a measuring probe. After applying a voltage across the center electrode and ground, the ion flow can be measured after the decay of the ignition spark.

With respect to the above, the following problems occur: a current offset occurs because of the shunt resistances outside and within the spark plug (for example, contamination of the spark plug insulator). This current offset interferes with an exact detection of the ion flow generated by the combustion and this offset is to be eliminated.

No ion flow measurement is possible during the burning duration of the ignition spark. A masking can lead to signal jumps in the ion flow measurement signal which, for example, leads to erroneous detections in a subsequent knock detection. The ignition process should be masked without disturbing the measurement signal.

Methods and components realized in analog technology, such as short-term integrators, or methods and components realized in digital technology are applied to evaluate the ion flow. It is conventional to switch the measurement signals of several cylinders sequentially to these resources in order to save cost (multiplexing). The multiplexing has to be executed without crosstalk between the cylinder channels. Furthermore, it is to be prevented that the now shorter signal segments, which are specific to a cylinder, lead to a reduction in quality when making the offset correction. The improvement of the reliability and the robustness of engine control functions and diagnostic functions is achieved by utilizing these signals with improved signal to noise ratio for the feature formation.

SUMMARY OF THE INVENTION

The object of the invention comprises providing a method which solves the above problems.

The invention is for a method and an arrangement for processing the ion flow signal of an internal combustion engine by offset correction, masking and multiplexing for engine control functions. An embodiment of the method of the invention includes the steps of: measuring the ion flow signal in each cylinder during an ignition operation to provide a measuring signal; then detecting the level value of the measurement signal of the cylinder for the purpose of offset correction; deriving a second signal from the measurement signal; during the masking, substituting the measurement signal in the second signal by the level value and subtracting the measurement signal from the second signal until the next ignition operation; and, then combining the channels to be multiplexed into a third signal by adding the second signals of the cylinders.

BRIEF DESCRIPTION OF THE DRAWINGS

The method of the invention and the arrangement of the invention for detecting the ion flow in internal combustion engines is explained hereinafter with respect to an embodiment with reference being made to FIGS. 1 to 6.

The relationship of the method and the arrangement to the technical background is made clear in FIG. 1 in the form of a block diagram. Specific configurations of the essential signal processing blocks are explained in greater detail in FIGS. 2 to 4 while including signal examples.

DESCRIPTION OF THE PREFERRED EMBODIMENTS OF THE INVENTION

Figure 1:
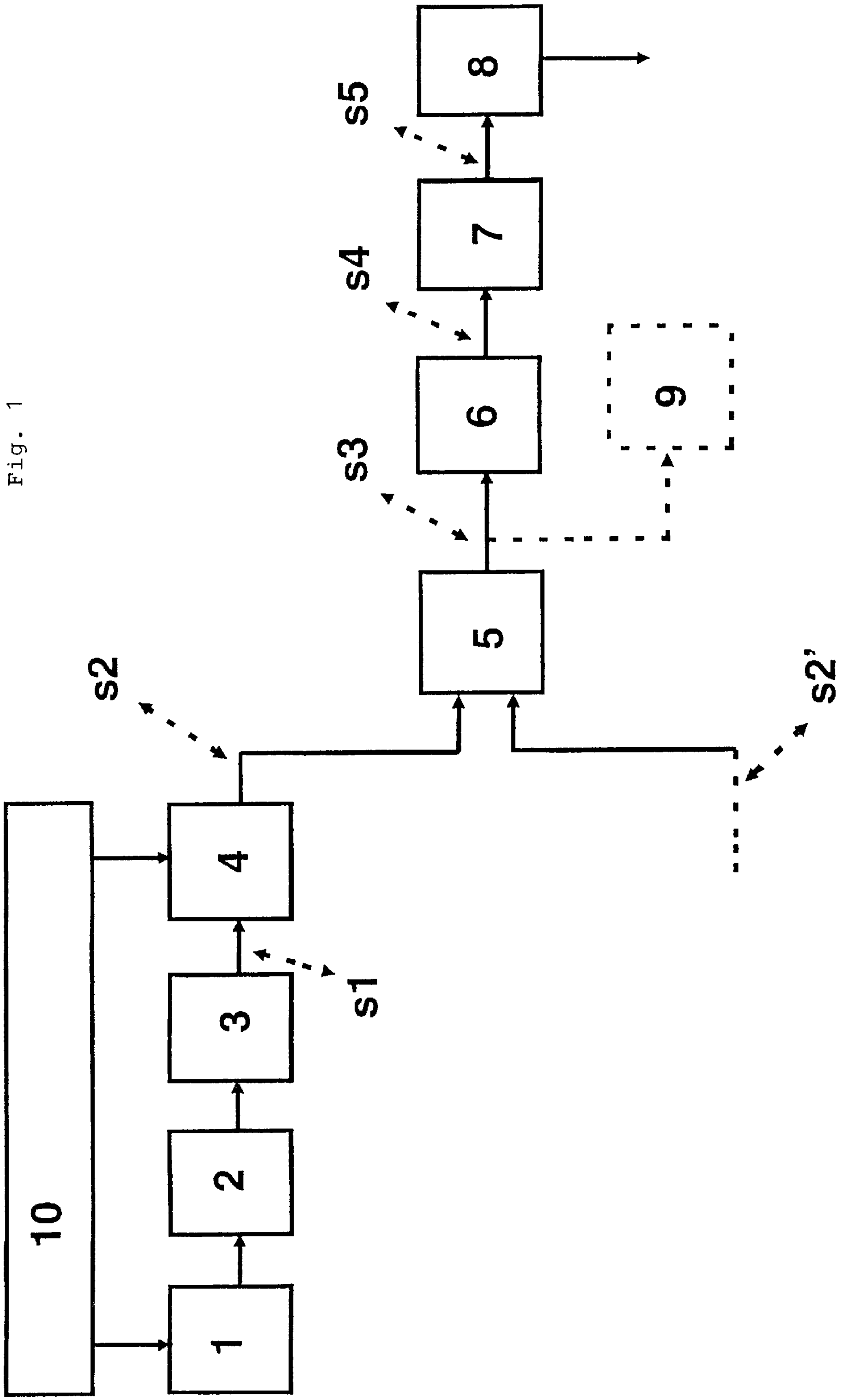

The complete signal processing chain is shown in detail in FIG. 1. The combustion process 2 is at the start of this chain and is initiated by the ignition 1. An ionization takes place in the combustion chamber for a proper mixture combustion. The means 3 functions to generate and measure an ion flow signal s1 which permits conclusions to be drawn as to the ionization process during the mixture combustion. Means 4 follows means 3 and the masking according to the invention and the offset correction of the ion flow signal takes place in means 4. The ion flow signals s2 from different cylinders are advantageously combined to a summation signal s3 with the aid of a multiplexing unit 5. The conditioning of the signal s3 in accordance with the invention makes possible the use of the same in addition to misfire detection also for further applications 9 such as knock detection.

A computer supported further processing is advantageous for the signal evaluation. A unit 6 can be used for the conversion of the time-continuous and value-continuous ion flow signal s3 into a digital signal sequence s4. The unit 6 includes an antialiasing filter 6.1 and an analog/digital converter 6.2. From the digital signal sequence s4, a feature former 7 extracts feature vectors s5 which are specific to a cylinder. The detection of the combustion misfires takes place in the downstream classifier 8 on the basis of these feature vectors s5. A control unit 10 is needed for the time-dependent drive of the ignition 1 as well as for the time-dependent drive of the means 4 of the invention for offset correction and masking.

Figure 2:
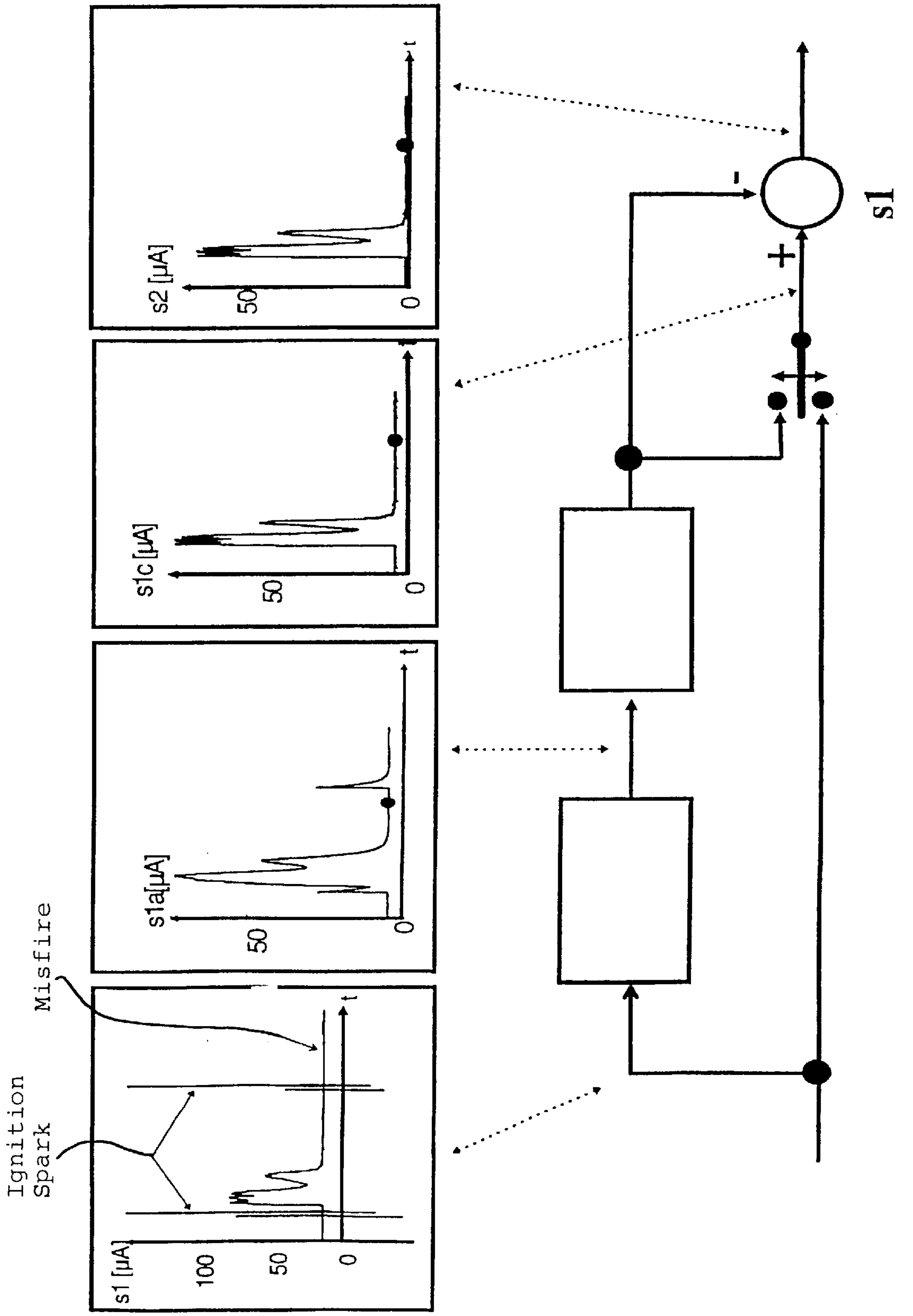

FIG. 2 shows the method of the invention for the offset value correction and for the ignition spark masking of the ion flow signal s1 generated with the aid of means 3. For this purpose, the signal s1*c* is generated in a first step from the signal si in such a manner that the signal s1 is passed through within a defined measurement window region and is converted to a constant substitute value s1*b* outside of this measurement window region. Especially, the portion of the ignition spark in the ion flow si is substituted with this substitute value s1*b*. The substitute value s1*b* should then correspond in order of magnitude to the residual offset of the ion flow signal s1. For this purpose, the substitute value s1*b* is determined for each cycle individually shortly before the ignition process by means of a scan hold circuit 4.2. Advantageously, the ion flow signal s1 is not directly accessed for the determination of the holding value s1*b*; instead, access is made to a disturbance corrected signal s1*a*. The disturbance correction of the signal s1 can, for example, take place with an adapted filter 4.1. The output signal s2 finally results by subtraction of the substitute value s1*b* from the ancillary signal s1*c*. This output signal s2 is characterized in that it is without discontinuity and is corrected of ignition influences as well as of a current offset caused by shunts.

Figure 3:
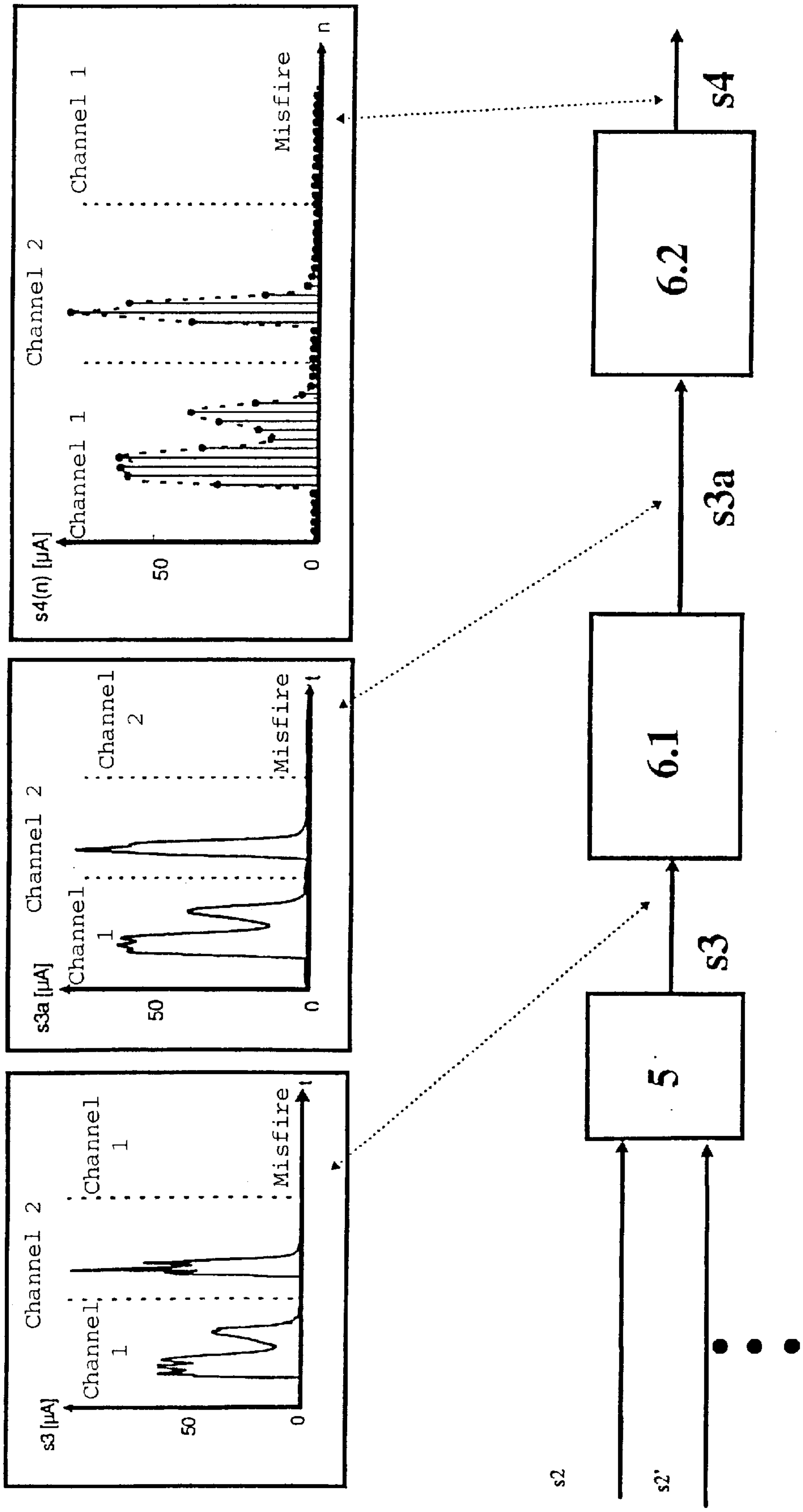

In FIG. 3, the downstream signal multiplexing 5 is shown. Because of the special characteristic of the cylinder-individual signals of the type of s2, the signals of several cylinders can be combined to a common signal s3 in the form of a time-dependent multiplexing. A mutual influencing of the multiplexed signals is precluded because of the measurement window substitution provided in 4. In this way, the resource complexity for the signal transmission and the subsequent digitalization is greatly reduced.

A filter 6.1 can be switched into the signal path forward of the analog-to-digital converter 6.2 in an advantageous manner. By a corresponding configuration of this filter, the possibility is present that signal s3 can be adapted especially to low scanning rates. A discrete signal sequence s4 is available at the output of the analog-to-digital converter 6.2.

Figure 4:
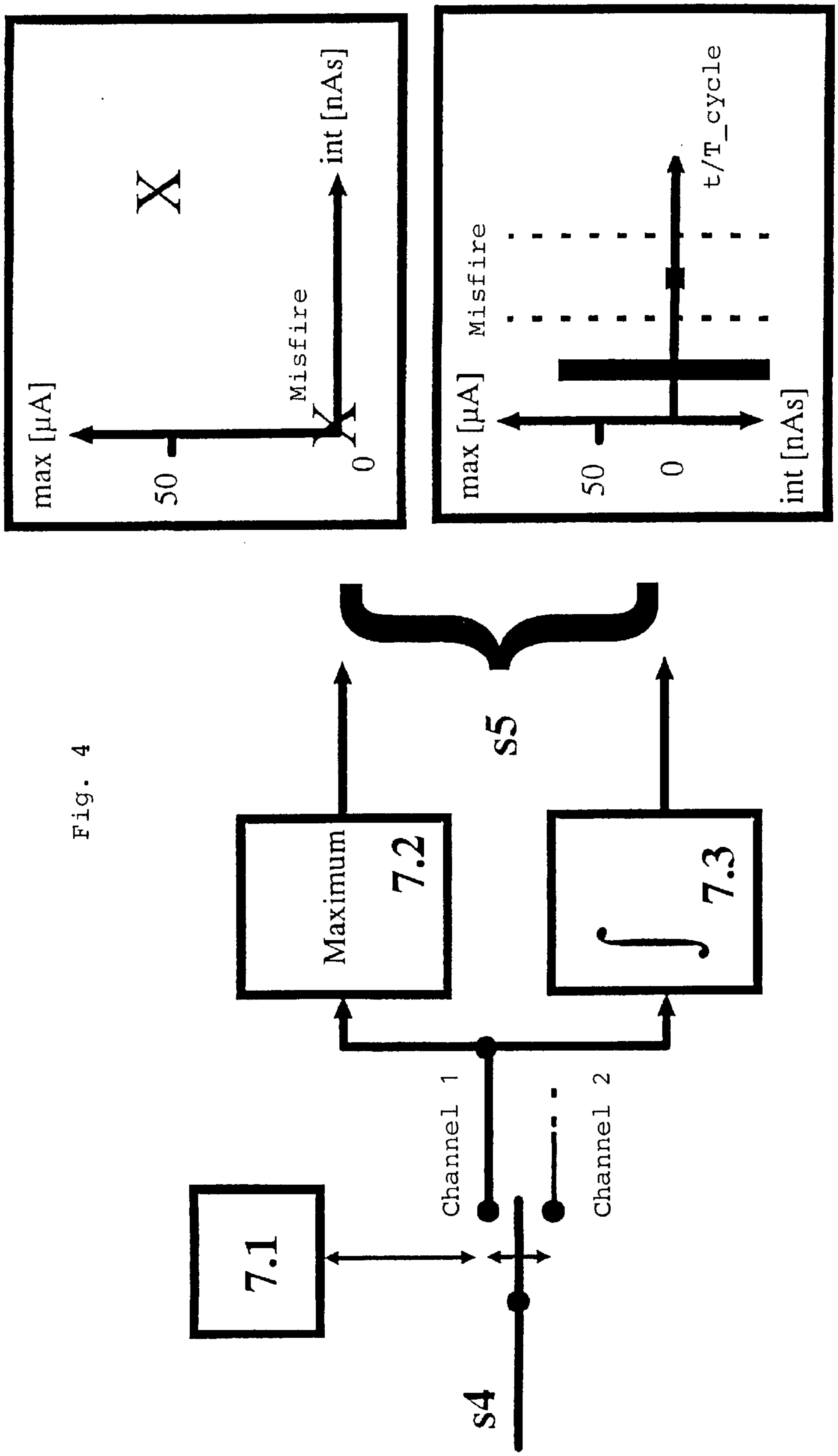

With the aid of the feature former 7, feature vectors s5 individual to each cylinder are formed from the signal s4. In FIG. 4, a possible realization of the feature former is shown as an example.

First, the continuous data current s4 are split into components individual to the cylinders with the aid of means 7.1. In a very simple embodiment, a two-dimensional feature vector can be formed for each cylinder-individual combustion cycle. This two-dimensional feature vector comprises the ion flow maximum value and the short-time integral over the ion flow measurement window. A downstream classifier 8 can distinguish regular combustions from combustion misfires based on the feature vectors s5 by a comparison to correspondingly computed threshold values.

Figure 5:
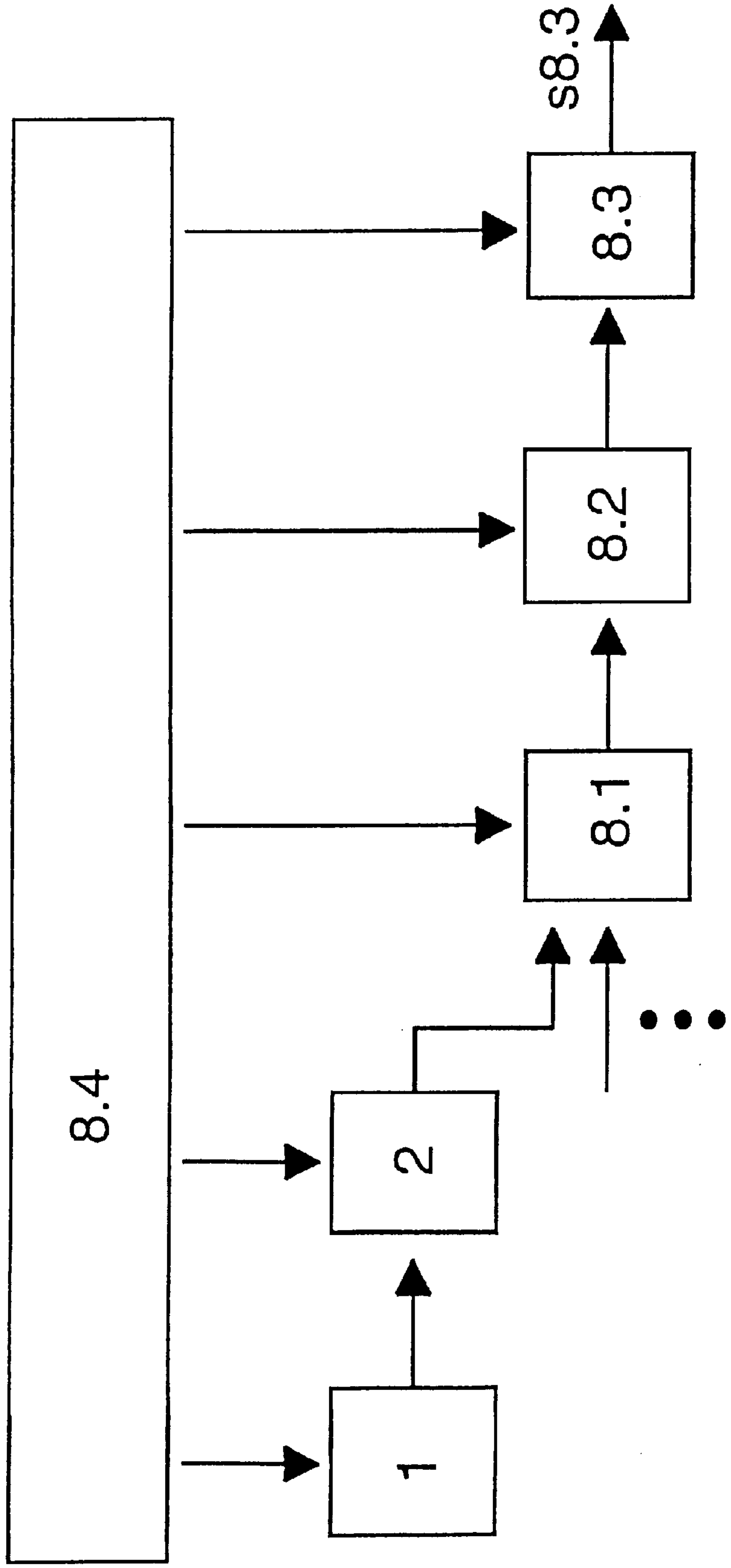
Figure 6:
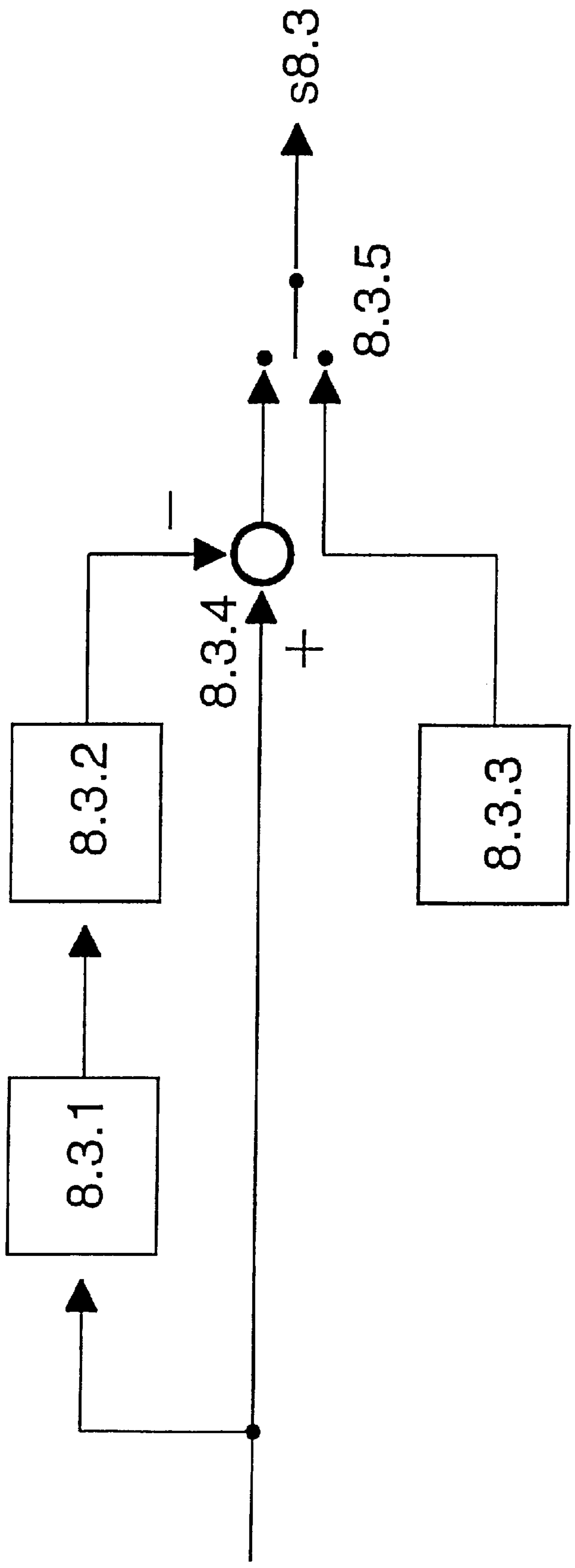

Based on the method shown above, an alternative method can be used which is explained in greater detail with respect to FIGS. 5 and 6.

This alternative method replaces the means 3, 4, 5 and 10 described in FIG. 1 and uses the signal from the combustion process 2 and supplies a signal s8.3 which is processed in accordance with the invention in the same manner as signal s3.

In the first step according to the invention, an ion flow is selected in the selector unit 8.1 from several ion flows from different cylinders in an advantageous manner. This ion flow signal is measured with means 8.2 before it is subjected in means 8.3 to the offset correction of the invention and the masking of the ignition spark. The masking of the ignition spark and the offset correction are shown in FIG. 6.

Before means 8.1 changes the selection of the ion flows, a switchover to a constant value is made with means 8.3.5. This constant value is fixed previously in accordance with the invention and does not permit a discontinuity in the signal s8.3. During this masking, a new offset value is first formed with the means 8.3.1 and 8.3.2. This new offset value is subtracted from the original signal from means 8.2 via means 8.3.4. The determination of the offset value is completed in accordance with the invention before the ignition spark can be seen in the ion flow signal. The disturbance correction of the signal from the combustion process 2 can, for example, take place with an adapted filter 8.3.1. If thereafter, the influence of the ignition spark on the ion flow signal is at an end, then there is a switchback with means 8.3.5 to the output of the means 8.3.4. The determined value from means 8.3.1 is held in the scan hold circuit 8.3.2 until the next switchover of means 8.3.5 and 8.1 so that an offset-corrected and disturbance-corrected signal s8.3 is present after means 8.3.5 for further processing in means 6. A control unit 8.4 is necessary for the time-dependent control of the means 1, 8.1, 8.2 and 8.3.

What is claimed is:

1. A method of processing an ion flow signal of an internal combustion engine, the method comprising the steps of:

selecting a cylinder of said engine for ion flow measurement and forming an ion flow signal;

forming an offset value for said cylinder and subtracting said offset value from said ion flow signal;

masking the ignition spark and masking the switchover of the cylinder which took place previously for making an ion flow measurement and an offset correction with a previously fixed constant value; and, processing this signal as a third signal.

2. An arrangement for processing an ion flow signal of an internal combustion engine, the arrangement comprising:

means for selecting a cylinder of said engine for ion flow measurement and forming an ion flow signal;

means for forming an offset value for said cylinder and subtracting said offset value from said ion flow signal; and, means for masking the ignition spark and masking the switchover of the cylinder which took place previously for making an ion flow measurement and an offset correction with a previously fixed constant value.

3. A method for processing the ion flow signal of an internal combustion engine by offset correction, masking and multiplexing for engine control functions, the method comprising the steps of:

measuring the ion flow signal in each cylinder during an ignition operation to provide a measuring signal;

then detecting the level value of the measurement signal of the cylinder for the purpose of offset correction;

deriving a second signal from said measurement signal;

during said masking, substituting said measurement signal in said second signal by said level value and subtracting said measurement signal from said second signal until the next ignition operation; and, then combining the channels to be multiplexed into a third signal by adding the second signals of said cylinders.

4. The method of claim 3, wherein the signal, which is so prepared, is further processed by a method for knock detection.

5. The method of claim 3, wherein the detected level values, which characterize the offset current, make possible a diagnosis of the ignition system and of the condition of the spark plug (spark plug contamination) by a comparison to fixed or operating-state dependent threshold values.

6. The method of claim 3, wherein a first feature arises from short-term integration of the third signal within a measurement window assigned to the individual cylinders and this first feature makes a misfire detection possible by comparison to fixed or operating-state dependent threshold values.

7. The method of claim 3, wherein the third signal is subjected to a lowpass filtering and analog-to-digital conversion and is used in a suitable microcomputer as the basis of further engine control functions.

8. The method of claim 3, wherein the misfire detection is carried out in accordance with the digitalization in the microcomputer.

9. The method of claim 3, wherein a second feature arises from a maximum value evaluation of the third signal within the measurement windows assigned to the individual cylinders; and, the second feature makes a misfire detection possible via a comparison to fixed or operating-state dependent threshold values.

10. The method of claim 9, wherein both features are used in a two-dimensional feature space to detect misfires.

11. An arrangement for processing the ion flow signal of an internal combustion engine by offset correction, masking and multiplexing for engine control functions, the arrangement comprising:

measuring means for measuring the ion flow signal in each cylinder during an ignition operation to provide a measuring signal;

detecting means for detecting the level value of the measurement signal of the cylinder for the purpose of offset correction;

means for deriving a second signal from said measurement signal;

means for substituting said measurement signal in said second signal by said level value and subtracting said measurement signal from said second signal until the next ignition operation; and, means for combining the channels to be multiplexed into a third signal by adding the second signals of said cylinders.

12. The arrangement of claim 11, wherein the signal, which is so prepared, is further processed by a method for knock detection.

13. The arrangement of claim 11, wherein the detected level values, which characterize the offset current, make possible a diagnosis of the ignition system and of the condition of the spark plug (spark plug contamination) by a comparison to fixed or operating-state dependent threshold values.

14. The arrangement of claim 11, wherein a first feature arises from short-term integration of the third signal within a measurement window assigned to the individual cylinders and this first feature makes a misfire detection possible by comparison to fixed or operating-state dependent threshold values.

15. The arrangement of claim 11, wherein the third signal is subjected to a lowpass filtering and analog-to-digital conversion and is used in a suitable microcomputer as the basis of further engine control functions.

16. The arrangement of claim 11, wherein the misfire detection is carried out in accordance with the digitalization in the microcomputer.

17. The arrangement of claim 11, wherein a second feature arises from a maximum value evaluation of the third signal within the measurement windows assigned to the individual cylinders; and, the second feature makes a misfire detection possible via a comparison to fixed or operating-state dependent threshold values.

18. The arrangement of claim 17, wherein both features are used in a two-dimensional feature space to detect misfires.

* * * * *